(12) United States Patent
Leccia et al.

(10) Patent No.: US 6,561,604 B2
(45) Date of Patent: May 13, 2003

(54) ARC-RESISTANT SWITCHGEAR CABINET

(75) Inventors: Brad R. Leccia, Bethel Park, PA (US);
James E. Smith, Bethel Park, PA (US)

(73) Assignee: Eaton Corporation, Cleveland, OH (US)

( * ) Notice: Subject to any disclaimer, the term of this patent is extended or adjusted under 35 U.S.C. 154(b) by 17 days.

(21) Appl. No.: 09/772,613

(22) Filed: Jan. 30, 2001

(65) Prior Publication Data

US 2002/0101141 A1 Aug. 1, 2002

(51) Int. Cl.[7] .............................................. A47B 49/00
(52) U.S. Cl. ......................... 312/326; 49/395; 292/26; 292/158; 312/217
(58) Field of Search .............................. 312/223.2, 326, 312/216, 217; 292/26, 27, 34, 36, 156, 157, 158; 49/395, 503, 394

(56) References Cited

U.S. PATENT DOCUMENTS

| | | | | |
|---|---|---|---|---|
| 184,680 A | * | 11/1876 | Whitson et al. | .......... 49/395 X |
| 2,486,460 A | * | 11/1949 | Bonenberger | ........... 312/217 X |
| 3,175,873 A | * | 3/1965 | Blomquist et al. | ...... 312/216 X |
| 5,905,244 A | | 5/1999 | Smith et al. | |
| 6,047,501 A | * | 4/2000 | Zeitler | .................... 312/220 X |
| 6,089,168 A | * | 7/2000 | Dunlap et al. | .......... 292/158 X |

\* cited by examiner

*Primary Examiner*—John G. Weiss
*Assistant Examiner*—Michael Fisher
(74) *Attorney, Agent, or Firm*—Martin J. Moran

(57) ABSTRACT

An arc-resistant switchgear cabinet includes a frame disposed on a floor and a door movably mounted on the frame. The frame includes a floor plate that is disposed against the floor and that includes a plurality of pins extending vertically upward from the floor plate. The door includes a plurality of corresponding receptacles into which the pins are received when the door is in a secured position. The pins in the receptacles resist the lower end of the door from moving in a horizontal direction away from the frame in the event of an arcing fault. A pair of bolts additionally fasten the lower corners of the door to the frame. The switchgear cabinet further includes interlocking tabs formed on the frame and on the door that overlap one another when the door is in the secured position.

17 Claims, 10 Drawing Sheets

ARC-RESISTANT SWITCHGEAR CABINET

BACKGROUND OF THE INVENTION

1. Field of the Invention

The present invention relates generally to switchgear cabinetry for use with circuit breakers and, more particularly, to a switchgear cabinet having a door that is configured to withstand the explosive forces of the gases produced during arcing faults.

2. Description of the Related Art

Metal-clad switchgear is desirably employed for medium voltage switchgear operating at voltages from 5 to 38KV, and for even higher voltages. In some switchgear configurations, circuit breakers and/or other elements of the switchgear are housed in metal enclosures and are removable. Draw-out apparatuses can be used to move the circuit breakers or other elements between a disconnect position in which the primary contacts between the circuit breaker and the switchgear cabinet are fully disengaged and a connect position in which the primary contacts are fully engaged. A hoist typically is often used to mount the circuit breaker on the draw-out apparatus and to remove it therefrom. Other types of switchgear are used in conjunction with circuit breakers that are mounted on casters and are rolled along a floor or on rails laid on the floor and directly into the switchgear cabinet instead of being mounted on draw-out apparatuses.

Such switchgear typically includes a variety of auxiliary devices and related control circuitry included potential transformers, current transformers, and fuse drawer components. The design of such metal-clad switchgear typically concentrates on structures that reduce the possibility of arcing faults within the enclosure. For instance, all primary elements such as breakers, voltage transformers, and control power transformers have disconnect means with isolating shutters to establish isolation from the high voltage sources.

All operations on breakers, potential transformers, and current transformers in the metal-clad switchgear are preferably performed with the compartment doors closed for operator safety. The front door may be interlocked with the shutter assembly to reduce the chance of accidental opening of the front door during partial levering-in of the breaker or other equipment.

The switchgear enclosures that contain the primary elements of the power distribution system such as the circuit breaker compartment, the main bus compartment, and the cable compartment have been compartmentalized and grounded for maximum isolation and confinement. Within these compartments, all live parts where possible are fully insulated to reduce the likelihood of an arcing fault.

Although arcing faults are rare, injuries from arcing faults in metal-clad switchgear nevertheless may occur. Arcing faults are very destructive due to the high energy levels reached within a confined compartment. The structural containment must be adequate to substantially prevent the escape of arcing products and hot gases from the faulted compartment. Burns can result if operating personnel are in close proximity with the faulted switchgear.

Arcing faults can occur within a switchgear compartment as a result of insulation failure or human error. The pressure from an electric arc is developed from two sources: the expansion of the metal by boiling, and the heating of air by the arc energy. Copper expands by a factor of 67,000 times in vaporizing. This accounts for the expulsion of near-vaporized droplets of molten metal from the arc. One test has shown that droplets could be propelled up to ten feet. The pressure also generates and directs plasma outward from the arc for distances proportional to the arc energy. One cubic inch of copper vaporizes into 1.44 cubic yards of vapor. The air in the arc stream expands due to its being heated from ambient temperature to the temperature of the arc (approximately 35,000° F.).

All of this happens within the at least first half cycle of the fault and results in a sudden and dramatic increase in pressure inside the compartment. Such elevated pressure acting on the door of the faulted compartment can potentially generate sufficient force to blow the door off the cabinet. Such switchgear thus must be designed to not only reduce the likelihood of arcing but also to contain and withstand the pressures that are created during such arcing in order to prevent personal injury.

Switchgear can be designed in numerous ways to retain the door thereon and to resist the door from being blown open or off during an arcing fault. Such doors typically have included overlapping or interlocking members around the perimeter of the door that operate as interference structures which interfere with movement of the door away from the frame of the switchgear cabinet and thus help to secure the door to the frame.

Special problems are introduced, however, for switchgear cabinetry that is used in conjunction with caster-mounted circuit breakers that are rolled on floor directly into the switchgear cabinet. The casters of such circuit breakers cannot easily be rolled over interlocking or overlapping structures that are disposed at the lower end of a cavity and that cooperate with structures disposed at the bottom end of the door. It is thus desired to provide an arc-resistant switchgear cabinet having retention structures at the bottom end thereof that secure the bottom of the door to the frame yet do not interfere, or at most only nominally interfere, with the operation of rolling the circuit breaker into and out of the cavity on casters.

SUMMARY OF THE INVENTION

In view of the foregoing, an arc-resistant switchgear cabinet includes a frame disposed on a floor and a door movably mounted on the frame. The frame includes a floor plate that is disposed against the floor and that includes a plurality of pins extending vertically upward from the floor plate. The door includes a plurality of corresponding receptacles into which the pins are received when the door is in a secured position. The pins in the receptacles resist the lower end of the door from moving in a horizontal direction away from the frame in the event of an arcing fault. A pair of bolts additionally fasten the lower corners of the door to the frame. The switchgear cabinet further includes interlocking tabs formed on the frame and on the door that overlap one another when the door is in the secured position.

It is thus an objective of the present invention to provide an arc-resistant switchgear cabinet having a door that is resistant to being blown open in the event of an arcing fault.

Another objective of the present invention is to provide an arc resistant switchgear cabinet formed with a cavity, in which a circuit breaker mounted on casters can be rolled from a floor into the cavity substantially free of interference with the retention structures that retain a door of the switchgear cabinet in a secured position during operation of the circuit breaker.

Another objective of the present invention is to provide an arc-resistant switchgear cabinet that is pivotable between an open position and a closed position, and that is translatable between the closed position and a secured position, with pins on a floor plate of the switchgear cabinet engaging receptacles in the door when the door is translated from the closed position to the secured position.

Another objective of the present invention is to provide an arc-resistant switchgear cabinet having a door that employs both interference structures as well as fasteners to retain the door in a secured position on the switchgear cabinet.

An aspect of the present invention is to provide an arc-resistant switchgear cabinet structured to be mounted on a floor, in which the general nature of the arc-resistant switchgear cabinet can be stated as including a frame that includes a floor plate, the floor plate being structured to engage the floor, a door mounted on the frame, the door being movable between an open position and a secured position, at least a first pin mounted on one of the door and the floor plate, the at least first pin being oriented substantially perpendicular to the floor plate, and the other of the door and the floor plate being formed with at least a first receptacle, the at least first pin being removably engageable in the at least first receptacle, the at least first pin being at least partially disposed in the at least first receptacle when the door is in the secured position, the at least first pin being disengaged from the at least first receptacle when the door is in the open position.

The door of the arc-resistant switchgear cabinet may include at least a first fastener structured to engage the door with the frame. Additionally, the door may be translatable between a closed position and the secured position, the closed position of the door being operationally interposed between the open position and the secured position of the door.

The frame may include a plurality of first tabs alternating with a plurality of first notches, and the door may include a plurality of second tabs alternating with a plurality of second notches, with the first tabs passing through the second notches and the second tabs passing through the first notches when the door is moved between the open and closed positions, and with the first tabs at least partially overlapping the second tabs when the door is in the secured position.

The arc-resistant switchgear cabinet may include a hinge extending between the frame and the door, with the door being pivotable on the hinge between the open position and the closed position.

The arc-resistant switchgear cabinet may also includes a closing mechanism operatively extending between the door and the frame and being structured to translate the door from the closed position to the secured position.

The arc-resistant switchgear cabinet may also include at least a first fastener extending between the door and the frame and being structured to engage the door with the frame.

BRIEF DESCRIPTION OF THE DRAWINGS

A further understanding of the invention can be gained from the following description of the preferred embodiment when read in conjunction with the accompanying drawings in which.

Similar numerals refer to similar parts throughout the specification.

DESCRIPTION OF THE PREFERRED EMBODIMENT

An arc-resistant switchgear cabinet 4 in accordance with the present invention is indicated generally in FIGS. 1–10. The cabinet 4 can be advantageously used in conjunction with a circuit breaker (not shown) that is rollably mounted on casters, although other types of circuit breakers may be employed for use with the cabinet 4. The cabinet 4 is advantageously configured to avoid injuries to personnel in the immediate vicinity of the cabinet 4 in the event of operative malfunctions within the cabinet 4, including but not limited to arcing faults.

Figure 1:
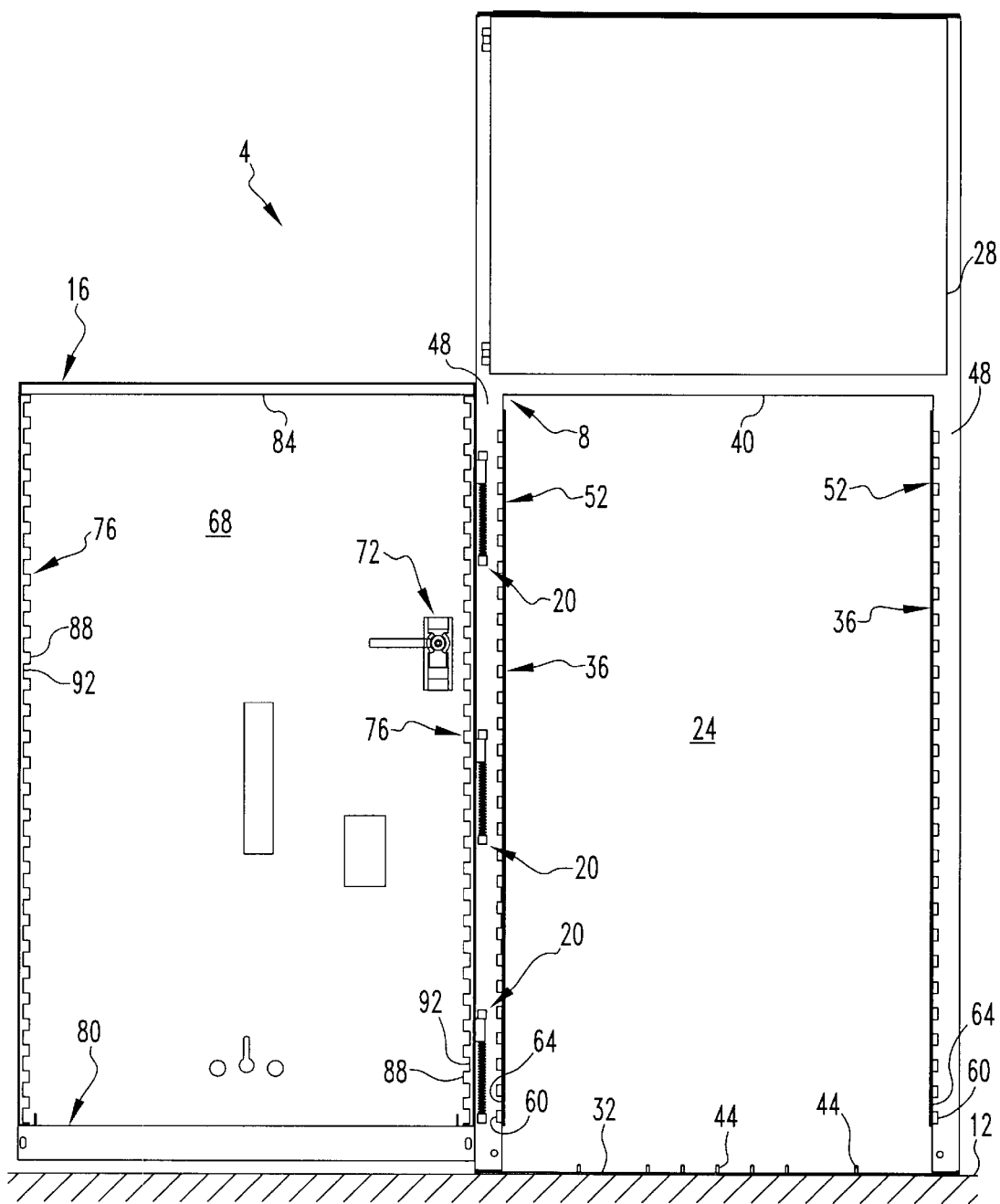
FIG. 1 is a front elevational view of an arc-resistant switchgear cabinet in accordance with the present invention in which a door of the cabinet is in an open position.
Figure 2:
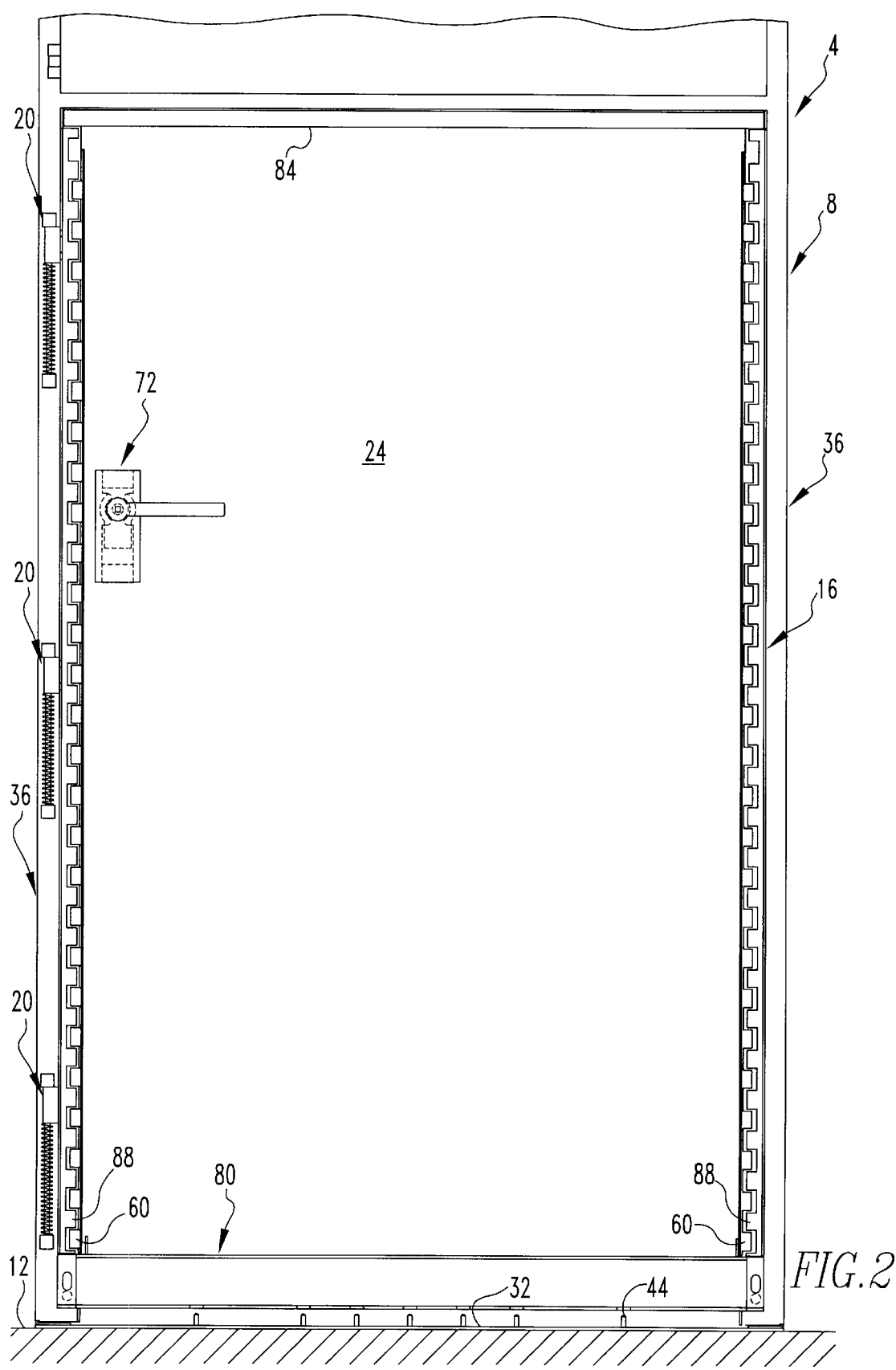
FIG. 2 is a front elevational view of the cabinet with the door in a closed position, with the door being partially cut away to reveal internal features of the cabinet.
Figure 3:
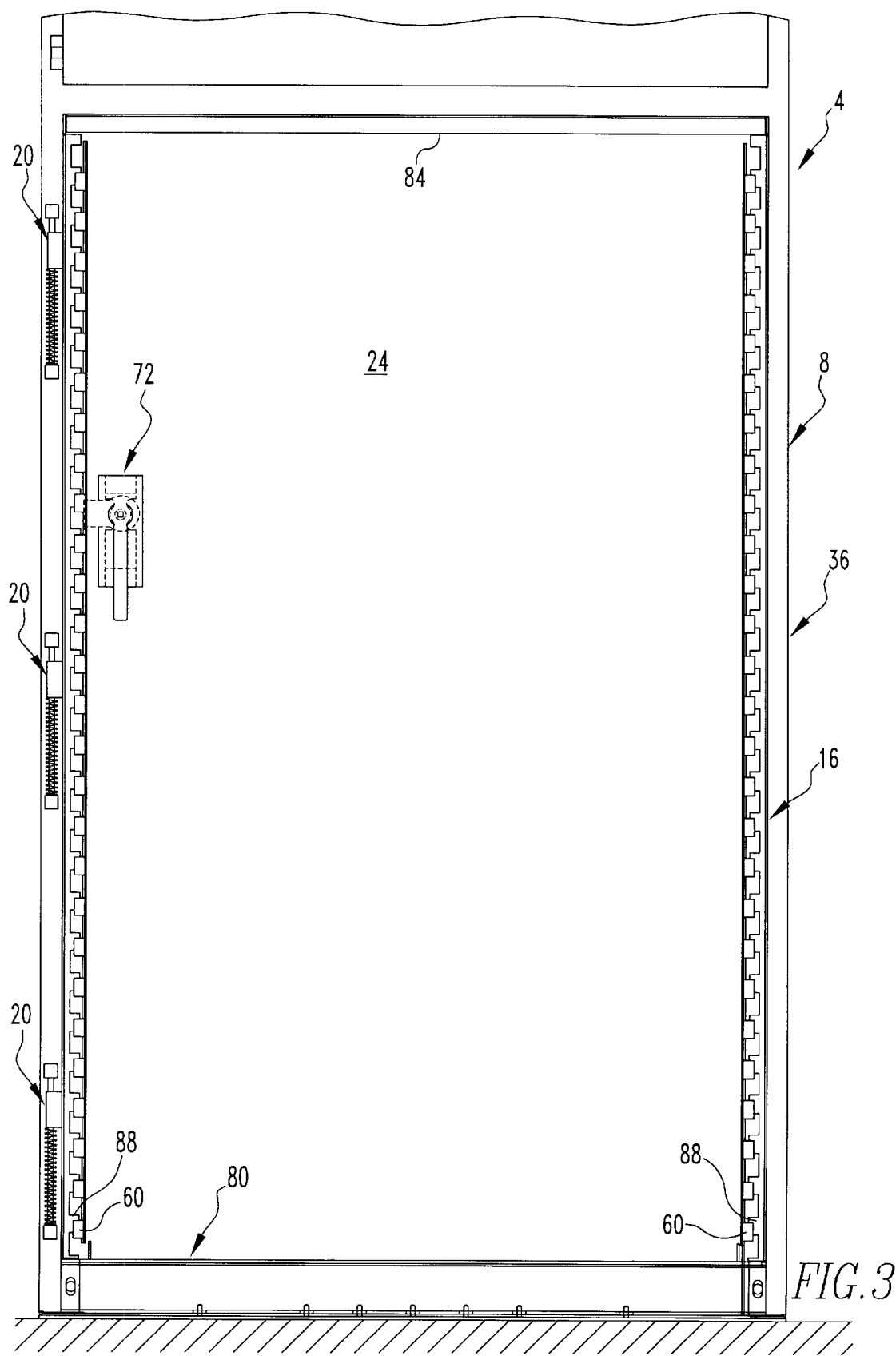
FIG. 3 is a view similar to FIG. 2, except showing the door in a secured position prior to installation of a pair of fasteners thereon.

As is best shown in FIGS. 1–3, the cabinet 4 includes a frame 8 that is mounted on a floor 12 and a door 16 that is movably mounted on the frame 8 with a plurality of hinges 20. The frame 8 and the door 16 together define a cavity 24 into which the circuit breaker can be rollably received on its casters. It is understood, however, that other types of circuit breakers, such as those not mounted on casters, can be operatively received in the cavity 24 without departing from the concept of the present invention.

The cabinet 4 additionally includes a plurality of electrical contacts (not shown) that extend to the line and to the load and that are operatively connectable with the circuit breaker. The cabinet 4 further includes a cover 28 that is movably mounted on the frame 8 and behind which is an auxiliary compartment that can be used to store additional componentry and the like for operation of the cabinet 4.

The frame 8 includes a substantially planar floor plate 28 disposed against the floor 12, a pair of upright frame members 36 extending upwardly from opposite sides of the floor plate 32, and a substantially horizontal cross member 40 extending between the frame members 36 on the opposite end of the cavity 24 from the floor plate 32. The floor plate 32 includes a plurality of pins 44 that extend substantially vertically upward therefrom in a direction generally away from the floor 12.

It can be seen that the cross member 40 is interposed between the cavity 24 and the auxiliary compartment that is behind the cover 28. The frame members 36 and the cross member 40 additionally include plate structures (not shown) that extend rearward therefrom and into the page of FIGS. 1–3, as well as a rear plate (not shown) that connects with such plate structures and the floor plate 32.

The door 16 is pivotable on the hinges 20 between an open position (FIG. 1) and a closed position (FIG. 2). Additionally, the door 16 is translatable on the hinges 20 between the closed position (FIG. 2) and a secured position (FIG. 3). As will be set forth more fully below, in translating the door 16 from the closed position to the secured position, a number of interference structures are operatively engaged with one another to resist the door 16 from being dislodged from the frame 8 in the event of an arcing fault or other failure.

As is best shown in FIG. 1, each frame member 36 includes a substantially planar face plate 48 oriented parallel with the plane of the page of FIG. 1 and an elongated right-angled tab plate 52 (FIGS. 8–10) that extends in a reentrant fashion from the face plate 48. From the perspective of FIG. 1, the tab plate 52 extends out of the page of FIG. 1 from the face plate 48 and thereafter in a direction parallel with the plane of FIG. 1. The tab plate 52 includes a plurality of first tabs 60 (FIG. 1) that alternate with a plurality of first notches 64. While the face plates 48 are each connected at the lower end thereof with the floor plate 32, it can be seen from FIGS. 1 and 6–10 that the tab plates 52 terminate at a clearance end 56 that is spaced from the floor plate 32.

With continued attention being directed to FIG. 1, the door 16 includes a substantially planar front panel 68, a closing mechanism 72 disposed on the front panel 68, a lower channel 80 along the lower edge of the front panel 68 adjacent the floor, an upper channel 84 opposite the lower channel 80, and a pair of tab flanges 76 on opposite sides of the front panel 68 and extending vertically between the lower and upper channels 80 and 84. The tab flanges 76 are angled channels that extend in a reentrant fashion with respect to the front panel 68 and each include a plurality of second tabs 88 that alternate with second notches 92 therebetween. The second tabs and notches 88 and 92 are configured to cooperate with the at least first tabs and notches 60 and 64 in a fashion to be set forth more fully below.

As can be seen in FIGS. 1–7, the hinges 20 extend between one of the tab flanges 76 and the base plate 48 of one of the frame members 36. More specifically, each of the hinges 20 includes a shaft 96 extending between an upper mount 100 and a lower mount 104 disposed on the face plate 48, with a pivot body 108 and a spring 112 being movably mounted on the shaft 96. More specifically, the pivot body 108 is both pivotably and translatably disposed on the shaft 96 and is fixedly attached to the tab flange 76. The spring 112 is interposed between the pivot body 108 and the lower mount 104 and serves as a biasing device to bias the pivot bodies 108 and thus the door 16 in a direction vertically upward from the secured position toward the closed position. It thus can be seen that the hinges 20 both pivotably and translatably mount the door 16 to the frame 8 and bias the door from the secured position to the closed position.

Figure 4:
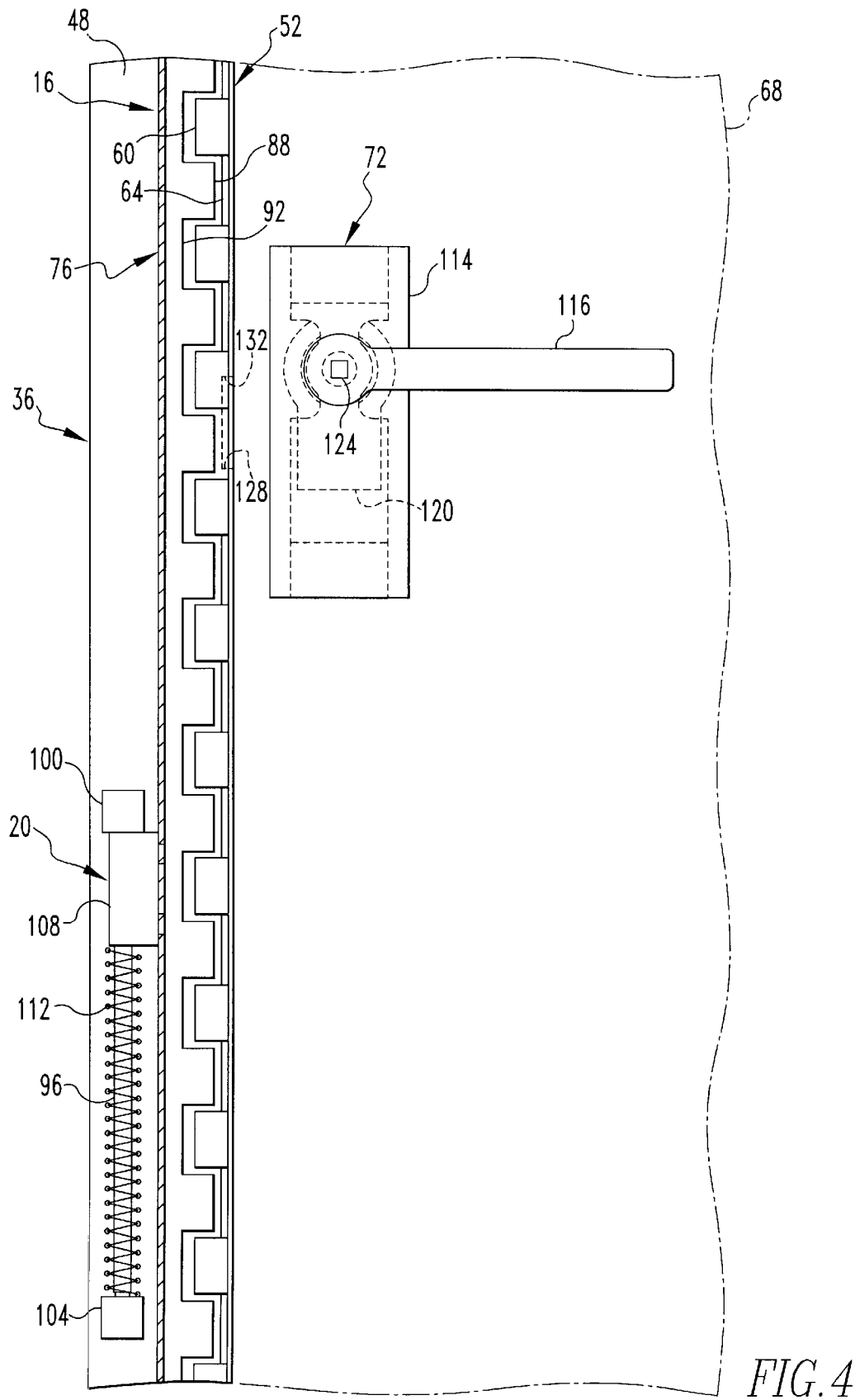
FIG. 4 is an enlarged view of a portion of FIG. 2.
Figure 5:
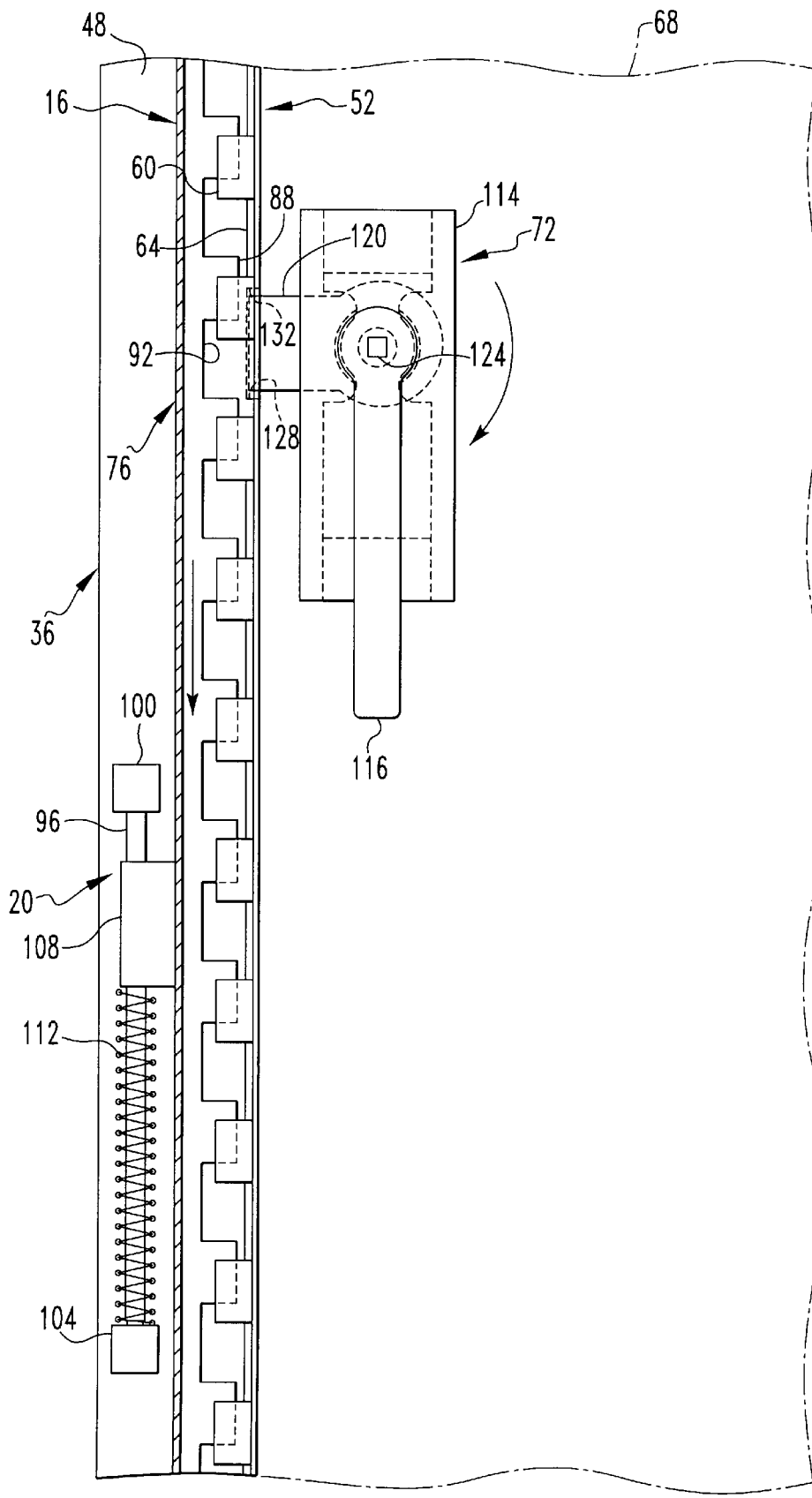
FIG. 5 is an enlarged view of a portion of FIG. 3.

FIGS. 2–7 are shown with the front panel 68 of the door 16 cut away to more clearly depict the interaction between the door 16 and the frame 8. As is best shown in FIGS. 4 and 5, the closing mechanism 72 includes a mounting plate 114, with a handle 116, a pivot plate 120, and a connection link 124 operatively mounted on the mounting plate 114. It can be understood from FIG. 1 that the mounting plate 114 is fixedly mounted on front panel 68. As can be seen from FIGS. 4 and 5, the handle 116 and the pivot plate 120 are connected with one another via the connection link 124, with the handle 116, connection link 124, and pivot plate 120 being pivotable with respect to the mounting plate 114. More specifically, the handle 116 is pivotable between an unlocked position (FIG. 4) and a locked position (FIG. 5). It can also be seen from FIGS. 4 and 5 that the pivoting of the handle between the unlocked and locked positions correspondingly pivots the pivot plate 120 therewith.

In moving the handle 116 from the unlocked position to the locked position, it can be seen that the pivot plate 120 is received in an opening 128 formed in the tab plate 52 to which the upper and lower mounts 100 and 104 of the hinges 20 are mounted. Moreover, during such movement the pivot plate 120 engages a reaction surface 132 of the opening 128. In this regard, it can be seen from FIG. 4 that when the handle 116 is in the unlocked position, the connection link 124 is at a vertical height that is slightly higher than the reaction surface 132. As such, when the handle 116 and pivot plate 120 are pivoted from the unlocked position toward the locked position, the pivot plate 120 initially engages the reaction surface 132. Further pivoting of the handle 116 causes the connection link 124 to move vertically downward and thereby translates the door 16 from the closed position to the secured position while the frame 8 remains substantially stationary. It can further be seen from FIGS. 4 and 5 that such translation of the door 16 from the closed position to the secured position correspondingly translates the pivot bodies 108 along the pins 96 to overcome the bias of and compress the springs 112.

In pivoting the door 16 from the open position to the closed position, it can be seen that the at least first tabs 60 pass through the second notches 92, and the second tabs 88 likewise pass through the at least first notches 64. As can be seen in FIG. 4, when the door 16 is in the closed position the at least first tabs 60 are aligned with the second notches 92 and the second tabs 88 are aligned with the at least first notches 64. Moreover, and from the perspective of FIG. 4, when the door 16 is in the closed position the second tabs 88 are disposed at a greater depth into the page of FIG. 4 than the at least first tabs 60. It thus can be seen that when the door 16 is moved from the closed position (FIG. 4) to the secured position (FIG. 5) the second tabs 88 are translated into an overlapping relation with the at least first tabs 60, with the at least first tabs 60 being disposed between the front panel 68 and the second tabs 88 to resist the door 16 from moving in a direction out of the page of FIG. 5.

The at least first and second tabs 60 and 88 thus cooperate as interference structures that are engagable with one another to resist movement of the door 16 in a certain direction with respect to the frame 8. The at least first and second tabs 60 and 88 thus resist the door 16 from being blown off of the frame 8 in a direction out of the plane of the page of FIG. 5 as a result of the explosive gases produced in the event of an arcing fault or other such failure.

As can be seen in FIGS. 6–10, the lower channel 80 is an elongated substantially U-shaped member having an extension web 136 that extends between an upper web 140 and a lower web 144. As is more particularly depicted in FIGS. 8–10, the upper web 140 is mounted on a lip 148 at the lower end of the front panel 68. It can further be seen that a pair of transfer plates 162 are disposed at opposite ends of the lower channel 80 and each extend between the free end of the lower web 144 opposite the extension web 136 and the lower end of the front panel 68 adjacent the lip 148.

Figure 6:
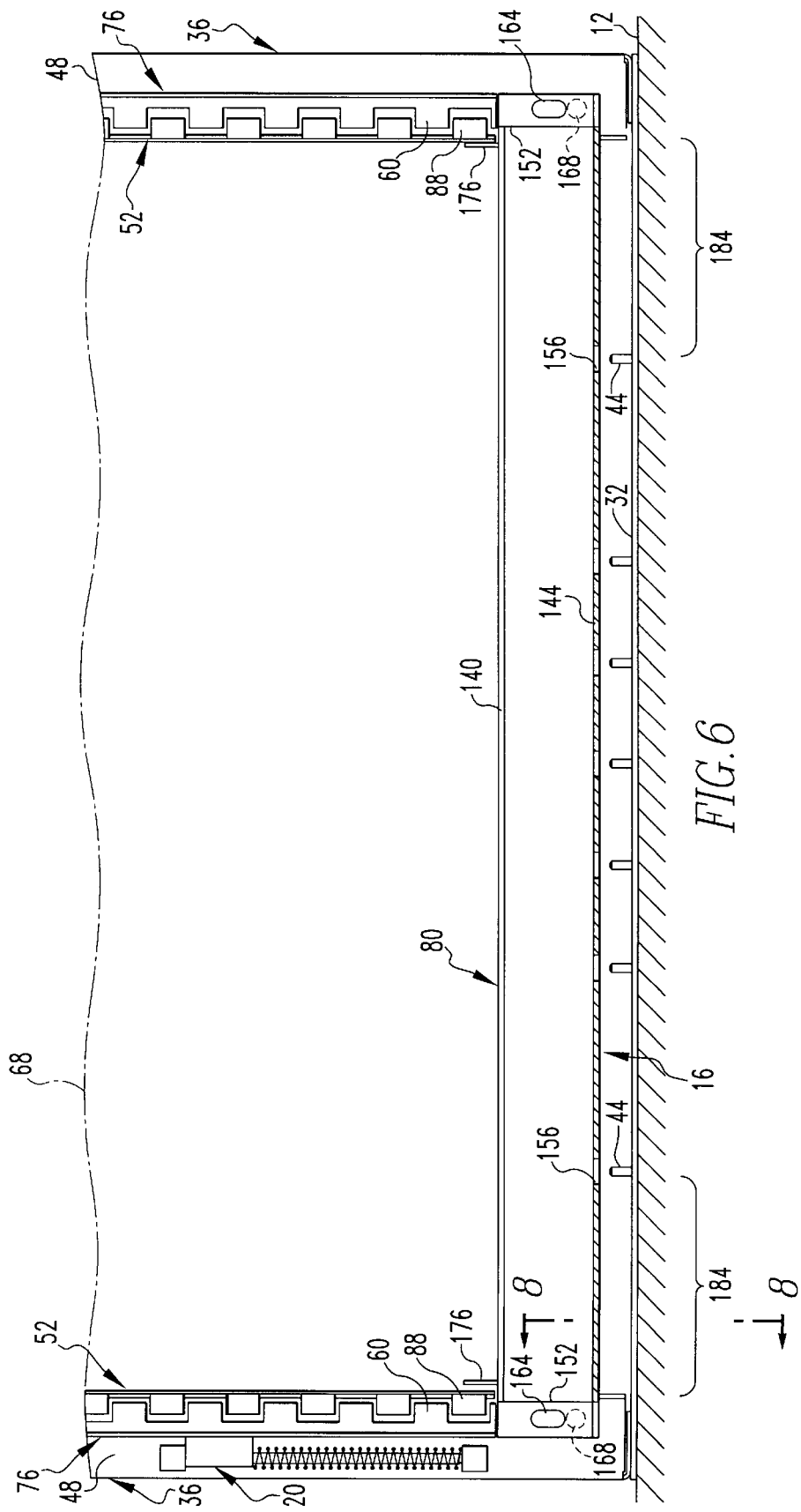
FIG. 6 is an enlarged view of the lower portion of FIG. 2.
Figure 7:
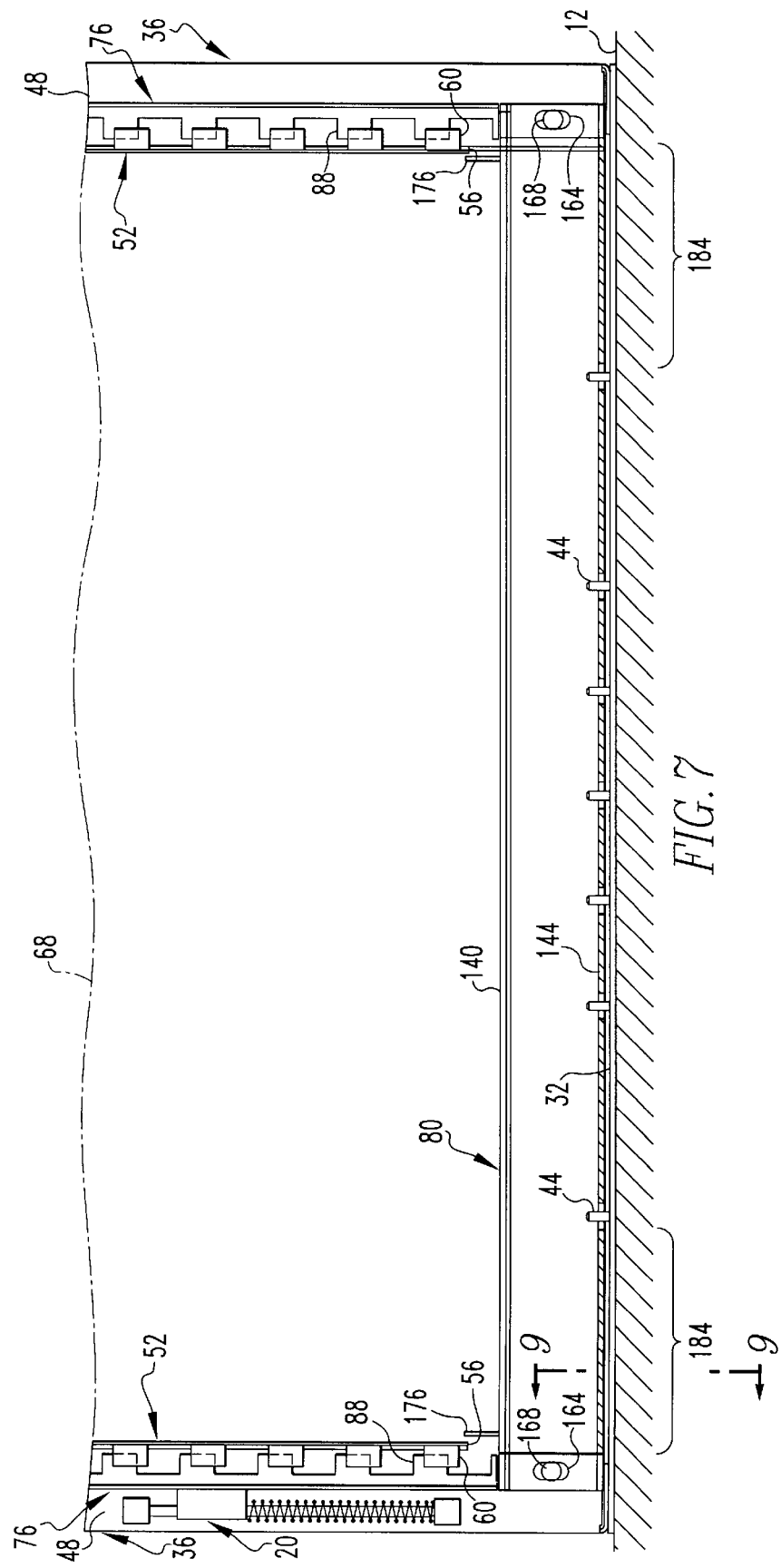
FIG. 7 is an enlarged view of the lower portion of FIG. 3.

As can be seen in FIGS. 6 and 7, the lower web 144 is formed with a plurality of receptacles 156 extending therethrough that correspond with the pins 44. When the door 16 is in the closed position (FIGS. 6 and 8) the pins 44 are disengaged from the receptacles 156. When the door 16 is translated from the closed position to the secured position, however, the pins 44 become engaged with the receptacles 156 (FIGS. 7 and 9).

It will be understood that in other embodiments (not shown) of the present invention, the cabinet 4 may be configured with the pins 44 mounted on the door 16 and the receptacles 156 formed in the floor plate 32. In such an embodiment, it may be desirable to slightly reconfigure the floor plate 32 to increase the extent to which the pins 44 are received in the receptacles 156, such as by making the floor plate 32 thicker or by bending the front edge of the floor plate 32 upwardly and away from the floor 12. It may also be possible to form extension holes into the floor 12 that correspond with the receptacles 156 and into which the pins 44 can additionally be received after extending through the floor plate 32.

Figure 8:
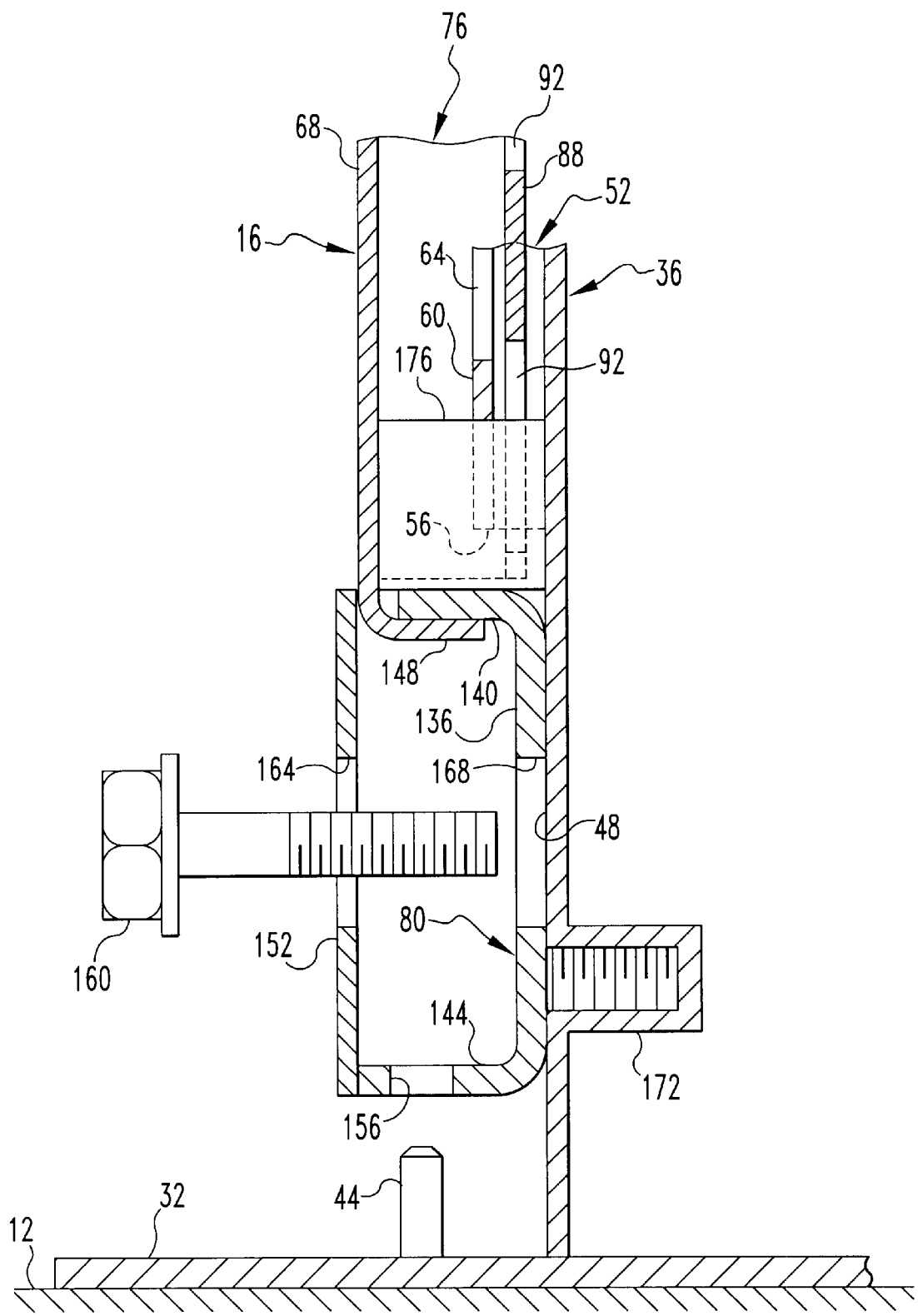
FIG. 8 is a sectional view as taken along line 8—8 of FIG. 6 and additionally including a fastener.
Figure 9:
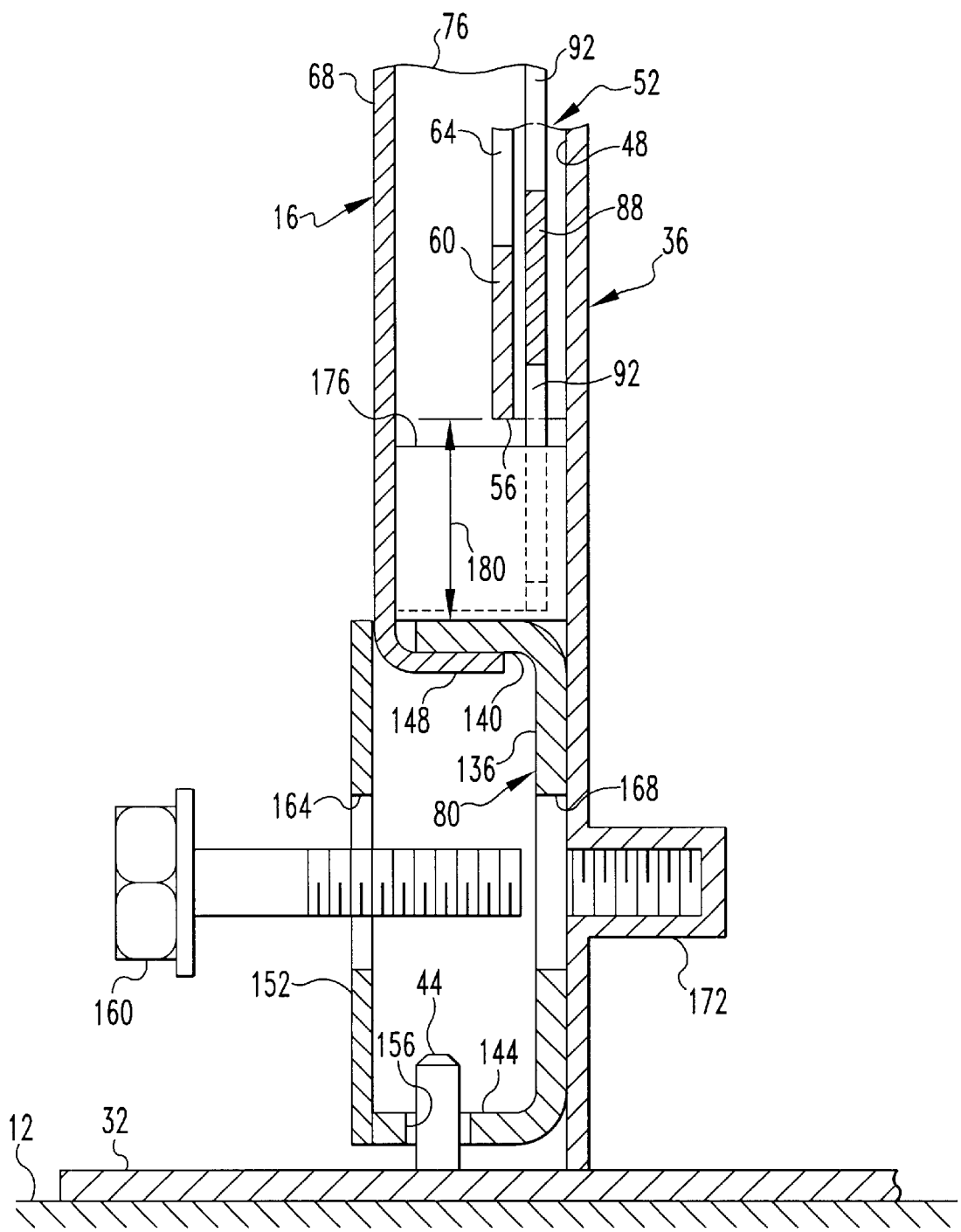
FIG. 9 is a sectional view as taken along line 9—9 of FIG. 3 and additionally including a fastener.
Figure 10:
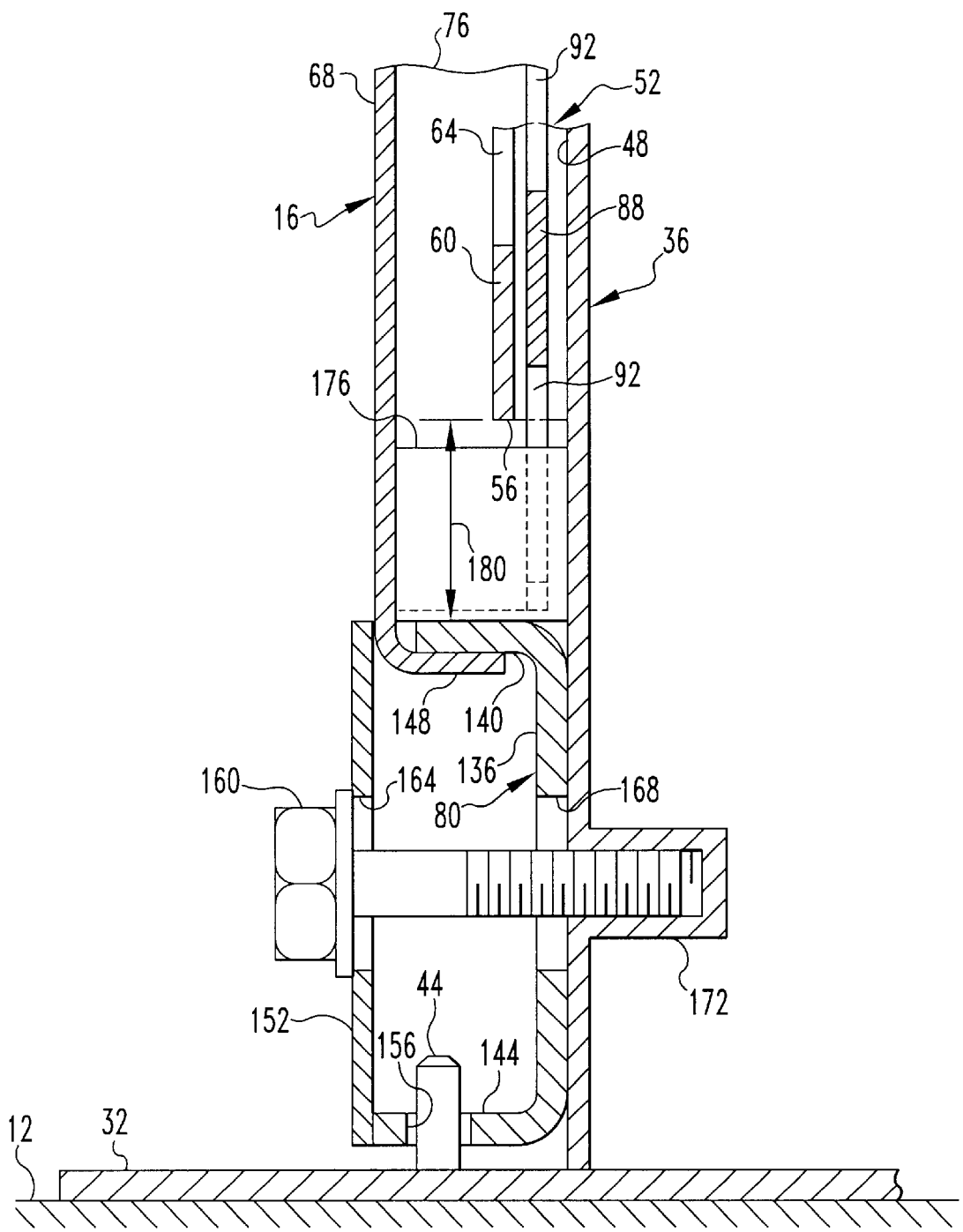
FIG. 10 is a view similar to FIG. 9, except depicting the fastener extending between the door and a frame of the cabinet.

When the pins 44 are engaged in the receptacles 156, the pins 44 mounted in the floor plate 32 resist movement of the door 16 away from the frame 8 in a direction out of the page of FIGS. 6 and 7 (or in a direction to the left in FIGS. 8–10). The pins 44 thus cooperate with the receptacles 156 to serve as interference structures that resist the door 16 from being blown off the frame 8 due to the action of gases resulting from an arcing fault or other such failure.

It can be seen from FIGS. 8–10 that a fastener 160 is receivable through a first fastener hole 164 formed in each transfer plate 152. A second fastener hole 168 that is aligned with each first fastener hole 164 is formed in the extension web 136 of the lower channel 80. It can further be seen from FIGS. 9 and 10 that when the door 16 is in the secured position, each fasteners 160 can be received through its corresponding second fastener hole 168 and engaged in a receiver 172 mounted on each face plate 48 of the frame members 36. While the fasteners 160 are depicted herein as being threaded bolts that are threadably engaged with the receivers 172, it is understood that numerous other types of fasteners such as bayonet connectors and the like may be employed without departing from the concept of the present invention.

The fasteners 160 received in the receivers 172 resist translation of the door from the secured position to the closed position. The fasteners thus can be said to retain the interference structures that are provided by the at least first and second tabs 60 and 88, and by the pins 96 and the receptacles 156, in engagement with one another as set forth herein to resist the door 16 from being blown off or undesirably displaced from the frame 8 in the event of an arcing or other fault. It can further be seen from FIG. 10 that the fasteners 160 and the receivers 172 can likewise be said to provide interference structures that resist movement of the door vertically upward with respect to the frame 8 from the perspective of FIG. 10.

If the fasteners 160 and receivers 172 cooperate to advance the fastener 160 into the receiver 172, such as if they are threadably cooperable, the fasteners 160 transfer a force through the transfer plates 152 to engage the lower channel 80 against the face plates 48 of the frame members 36. Such engagement can also be provided in other fashions, such as by initially applying forces to the door 16 before engaging the fasteners 160 with the receivers 172, with at least a portion of the initial forces being residually retained.

Engagement between the lower channel 80 and the face plates 48 provides frictional resistance between the extension web 136 and the face plates 48 to further resist movement of the door 16 from the secured position to the closed position. Moreover, regardless of the type of cooperation between the fasteners 160 and the receivers 172, the fasteners 160 each have an enlarged head that engages the corresponding transfer plate 152 to resist movement of the lower channel 80, and thus of the door 16, in a direction directly away from the frame 8. The fasteners 160 in cooperation with the receivers 172 thus provide additional restraining structures that resist the door 16 from being blown off of the frame 8 in the event of an arcing or other fault.

As can be seen in FIGS. 6–10, a pair of blocking plates are disposed on the upper web 140 near but spaced inwardly of the opposite ends of the lower channel 80. As is best seen in FIGS. 6 and 7, the blocking plates 176 are disposed adjacent the tab plates 52 of the frame members 36. As can be seen in FIG. 6, when the door 16 is in the closed position, the upper web 140 is spaced slightly from the clearance ends 56 of the tab plates 52. When the door 16 is translated to the secured position (FIG. 7,) however, the lower channel is translated vertically downward with respect to the frame 8 such that a gap 180 exists between the upper web 140 and each clearance end 56. In order to resist the gases produced as a result of an arcing or other fault from rushing out of the gaps 180, the blocking plates 176 are advantageously disposed on the upper web 144 and are sized to substantially cover the gaps 180. The blocking plates 176 are spaced slightly from the tab plates 62 in order to permit the relatively slow dissipation of such gases at velocities that will reduce the likelihood of causing burns to personnel nearby the cabinet 4 during an occurrence of an arcing or other fault. It is understood that the blocking plates 176 can be of numerous other configurations without departing from the concept of the present invention.

In operation, therefore, it can be seen that the door 16 is pivotable on the hinges 20 from the open position to the closed position to cause the at least first tabs 60 to pass through the second notches 92 and to cause the second tabs 88 to pass through the at least first notches 64. In this regard, the springs 112 are preferably configured to bias the door 16 to a sufficient vertical height to permit the tabs to pass through the notches, although this may not be desirable in all applications.

The door 16 can then be translated on the hinges 20 from the closed position to the secured position by pivoting the handle 116 from the unlocked position to the locked position. Such translation of the door 16 overcomes the bias of the springs 112 of the hinges 20, causes the at least first and second tabs 60 and 88 to at least partially overlap one another, and engages the pins 44 in the receptacles 56. Such engagement of the interference structures provided by the at least first and second tabs 60 and 88 and by the pins 44 and receptacles 156 resists movement of the door 16 in a direction away from the frame 8, which resists the door 16 from being blown off the frame 8 in the event of an arcing fault. With the door 16 in a secured position, the fasteners 160 can be received in the receivers 172 to resist translation of the door from the secured position to the closed position due to the biasing of the door 16 vertically upward by the springs 112, and further resists movement of the door 16 away from the frame 8.

The door 16 can be opened by removing the fasteners 160 from the receivers 172 and rotating the handle 116 from the locked position to the unlocked position. The springs 112 bias the door 16 from the secured position to the closed position which assists in disengaging the second tabs 88 from the at least first tabs 60 and the lower channel 80 from the pins 44, which thus allows the door 16 to be pivoted from the closed position to the open position.

The spacing of the pins 44 on the floor plate 32 advantageously permits a circuit breaker rollably mounted on casters to be rolled into and out of the cavity 24 substantially without interference by the cabinet 4. More specifically, it can be seen from FIGS. 6 and 7 that a substantial space 184 exists between each frame member 36 and the closest pin 44 thereto. The spaces 184 are provided to permit the casters of the circuit breaker to roll between the frame members 36 and the pins 44 without encountering any of the pins 44.

In this regard, it is understood that in receiving the circuit breaker into the cavity 24, the casters must rollably traverse the small step formed by the front edge of the floor plate 32. The front edge of the floor plate 32 provides at most only a minor interference to the rollable installation of the circuit breaker from the floor 12 into the cavity 24. It is further understood that the floor plate 32 can be beveled at the front edge thereof or can additionally include small ramp structures that further facilitate the rolling installation of the circuit breaker from the floor 12 into the cavity 24.

The cabinet 4 is thus advantageously configured to permit the rollable installation of a circuit breaker into the cavity 24 without providing any meaningful resistance to such installation, yet further it is configured to securely retain the door 16 on the frame 8 with interference structures. Such interference structures specifically retain the lower channel 80 of the door 16 in a fixed relation to the frame 8 without providing any meaningful obstacle to the installation or removal of the circuit breaker into or from the cavity 24.

While a particular embodiment of the present invention has been described herein, it is understood that various changes, additions, modifications, and adaptations may be made without departing from the scope of the present invention as set forth in the following claims.

What is claimed is:

1. An arc-resistant switchgear cabinet structured to be mounted on a floor, the arc-resistant switchgear cabinet comprising:
    a frame including a floor plate and at least a first hinge, the floor plate being structured to engage the floor;
    a door mounted both pivotably and translatably on the at least first hinge, the door being pivotable on the at least first hinge between an open position and a closed position, the door being translatable on the at least first hinge between the closed position and a secured position;
    at least a first pin mounted on one of the door and the floor plate, the at least first pin being oriented substantially perpendicular to the floor plate;
    the door being translatable in a direction generally parallel with the at least first pin and
    the other of the door and the floor plate being formed with at least a first receptacle, the at least first pin being removably engageable in the at least first receptacle, the at least first pin being at least partially disposed in the at least first receptacle when the door is in the secured position, the at least first pin being disengaged from the at least first receptacle when the door is in the closed position.

2. The arc-resistant switchgear cabinet as set forth in claim 1, in which the at least first pin is mounted on the floor plate and the at least first receptacle is formed in the door.

3. The arc-resistant switchgear cabinet as set forth in claim 2, in which the door includes at least a first fastener structured to engage the door with the frame when the door is in the secured position.

4. The arc-resistant switchgear cabinet as set forth in claim 3, in which the at least first fastener extends between the door and a receiver disposed on the frame to retain the door in the secured position.

5. The arc-resistant switchgear cabinet as set forth in claim 1, in which one of the door and the frame includes a closing mechanism operatively extending between the door and the frame and being structured to translate the door from the closed position to the secured position.

6. The arc-resistant switchgear cabinet as set forth in claim 5, in which the closing mechanism includes a pivot plate disposed on one of the door and the frame, and in which the other of the door and the frame is formed with a reaction surface, the pivot plate being structured to engage the reaction surface to translate the door from the closed position to the secured position.

7. The arc-resistant switchgear cabinet as set forth in claim 6, in which the frame includes at least a first biasing device, the at least first biasing device biasing the door from the secured position to the closed position.

8. The arc-resistant switchgear cabinet as set forth in claim 6, in which the closing mechanism includes a handle operatively connected with the pivot plate, the handle being movable between an unlocked position and a locked position, the handle being structured to operatively engage the pivot plate with the reaction surface during movement of the handle from the unlocked position to the locked position.

9. An arc-resistant switchgear cabinet structured to be mounted on a floor, the arc-resistant switcbgear cabinet comprising:
    a frame including a floor plate and at least a first hinge, the floor plate being structured to engage the floor;
    a door mounted both pivotably and translatably on the at least first hinge, the door being pivotable on the at least first hinge between an open position and a closed position, the door being translatable on the at least first hinge between the closed position and a secured position;
    at least a first pin mounted on one of the door and the floor plate, the at least first pin being oriented substantially perpendicular to the floor plate;
    the other of the door and the floor plate being formed with at least a first receptacle, the at least first pin being removably engageable in the at least first receptacle, the at least first pin being at least partially disposed in the at least first receptacle when the door is in the secured position, the at least first pin being disengaged from the at least first receptacle when the door is in the closed position; and
    in which the frame Includes a plurality of first tabs alternating with a plurality of first notches, and in which the door includes a plurality of second tabs alternating with a plurality of second notches, the first tabs passing through die second notches and the second tabs passing through the first notches when the door is moved between the open and closed positions, the first tabs at least partially overlapping the second tabs when the door is in the secured position.

10. An arc-resistant switchgear cabinet structured to be mounted on a floor, the arc-resistant switchgear cabinet comprising:
    a frame including a floor plate and at least a first hinge, the floor plate being structured to engage the floor;
    a door mounted both pivotably and translatably on the at least first hinge, the door being pivotable on the at least first hinge between an open position and a closed position, the door being translatable on the at least first hinge between the closed position and a secured position;
    at least a first pin mourned on one of the door and the floor plate, the at least first pin being oriented substantially perpendicular to the floor plate; and the other of the door and the floor plate being formed wit at least a first receptacle, the at least first pin being removably engageable in the at least first receptacle, the at least first pin being at least partially disposed in the at least first receptacle when the door is in the secured position, the at least first pin being disengaged from the at least first receptacle when the door is in the closed position;

one of the door and the frame including a closing mechanism operatively extending between the door and the frame and being structured to translate the door from the closed position to the secured position;

the closing mechanism including a pivot plate disposed on one of the door and the frame, and in which the other of the door and the frame is formed with a reaction surface, the pivot plate being structured to engage the reaction surface to translate the door from the closed position to the secured position;

the closing mechanism including a handle operatively connected with the pivot plate, the handle being movable between an unlocked position and a locked position, the handle being structured to operatively engage the pivot plate with the reaction surface during movement of the handle from the unlocked position to the locked position; and in which the frame includes a plurality of first tabs alternating with a plurality of first notches, and in which the door includes a plurality of second tabs alternating with a plurality of second notches, the first tabs passing through the second notches and the second tabs passing through the first notches when the door is moved between the open and closed positions, the first tabs at least partially overlapping the second tabs when the door is in the secured position.

11. The arc-resistant switchgear cabinet as set forth in claim 10, in which the door includes at least first fastener extending between the door and the frame and being structured to engage the door with the frame when the door is in the secured position.

12. AC An arc-resistant switch gear cabinet structured to be mounted on a floor, the arc-resistant switchgear cabinet comprising;

a frame including a floor plate and at least a first hinge, the floor plate being structured to engage the floor;

a door mounted both pivotably and translatably on the at least first hinge, the door being pivotable on the at least first hinge between an open position and a closed position, the door being translatable on the at least first hinge between the closed position and a secured position;

at least a first pin mounted on one of the door and the floor plate, the at least first pin being oriented substantially perpendicular to the floor plate;

the other of the door and the floor plate being formed with at least a first receptacle, the at least first pin being removably engageable in the at least first receptacle, the at least first pin being at least partially disposed in the at least first receptacle when the door is in the secured position, the at least first pin being disengaged from the at least first receptacle when the door is in the closed position; and in which the frame includes a first tab and the door includes a second tab, the fast and second tabs at least partially overlapping one another when the door is in the secured position, the at least first pin being disengaged from the at least first receptacle when the door is in the closed position.

13. A method of retaining a door of an arc-resistant switchgear cabinet in a secured position with respect to a frame of the arc-resistant switchgear cabinet, the arc-resistant switchgear cabinet being disposed on a floor, the method comprising the steps of:

translating the door from a closed position to the secured position in a direction to engage at least a fast pin mounted on one of the door and a floor plate of the frame with at least a first receptacle formed in the other of the door and the floor plate;

overlapping a plurality of first tabs formed on the frame with a plurality of second tabs formed on the door; and fastening the door to the frame with a first fastener extending between the door and the frame when the door is in the secured position.

14. The method as set forth in claim 13, in which the step of translating the door includes the step of operatively engaging a pivot plate disposed on the door with a reaction surface formed on the frame.

15. The method as set forth in claim 14, in which the step of operatively engaging a pivot plate includes the step of moving a handle that is operatively connected with the pivot plate from an unlocked position to a locked position.

16. The method as set forth in claim 13, in which the step of translating the door includes the step of overcoming the bias of at least a first biasing device that biases the door from the secured position to the closed position.

17. The method as set forth in claim 13, further comprising the step of pivoting the door from an open position to the closed position.

* * * * *